United States Patent [19]

Frei

[11] Patent Number: 5,344,095
[45] Date of Patent: Sep. 6, 1994

[54] SAFETY BELT RETRACTOR WITH A BELT PRETENSIONER DEVICE ACTING ON THE BELT DRUM

[75] Inventor: Bernhard Frei, Waldstetten, Fed. Rep. of Germany

[73] Assignee: TRW Repa GmbH, Alfdorf, Fed. Rep. of Germany

[21] Appl. No.: 36,177

[22] Filed: Mar. 23, 1993

[30] Foreign Application Priority Data

Mar. 24, 1992 [DE] Fed. Rep. of Germany ....... 4209540

[51] Int. Cl.$^5$ ............................................. B60R 22/46
[52] U.S. Cl. .................................. 242/374; 242/384.2
[58] Field of Search .......... 242/107, 107.4 R, 107.4 A, 242/107.4 B; 280/806; 297/478, 480

[56] References Cited

U.S. PATENT DOCUMENTS

| | | | |
|---|---|---|---|
| 4,423,846 | 1/1984 | Fohl | 242/107 |
| 4,618,108 | 10/1986 | Butenop et al. | 242/107 |
| 4,750,685 | 6/1988 | Frei | 242/107 |
| 4,925,123 | 5/1990 | Frei et al. | 242/107 |
| 4,925,212 | 5/1990 | Motozawa | 280/807 |
| 5,114,090 | 5/1992 | Lindblad | 242/107 |

FOREIGN PATENT DOCUMENTS 3600004 7/1987 Fed. Rep. of Germany .

OTHER PUBLICATIONS

European Search Report EP 93 10 4296.

Primary Examiner—John M. Jillions
Attorney, Agent, or Firm—Tarolli, Sundheim & Covell

[57] ABSTRACT

A safety belt retractor is provided with a belt pretensioner device acting via a clamping roller coupling mechanism. A torsion rod (30) is arranged in the force flow path between the coupling mechanism and the belt drum (12) of the retractor, so that after tightening of the belt such torsion rod is twisted about its axis under the load transmitted by the belt with the consumption of energy. Owing to the plasitic deformation of the torsion rod (30), it is possible for the load peaks occurring following tightening of the belt in the belt system to be absorbed in order to increase the efficiency of the safety belt system.

8 Claims, 2 Drawing Sheets

SAFETY BELT RETRACTOR WITH A BELT PRETENSIONER DEVICE ACTING ON THE BELT DRUM

The present invention relates to a safety belt retractor with a belt pretensioner device acting on the belt drum by the intermediary of a coupling mechanism.

In a prior art belt retractor with a pretensioner device, see U.S. Pat. No. 4,423,846, the belt drum is locked after the belt has been tightened, since, by jamming of the clamping rollers in the coupling mechanism, the belt drum remains locked with the rotary drive of the pretensioner device, which for its part is locked after completion of the tightening stroke.

Attempts have already been made to increase the efficiency of safety belt systems fitted with a belt pretensioner device, by convening energy after the belt is tensioned in order to absorb load peaks in the belt. A conversion of energy is possible, for instance by using stretch members, which are arranged in the force flow path of the belt system so that they undergo plastic deformation under load.

The present invention provides a novel type of safety belt retractor with a belt pretensioner device in which a device for energy conversion is integrated. According to the invention, a torsion red is arranged in the force flow path between the coupling mechanism and the belt drum. After tightening of the belt and under heavy tensional load occurring in the belt webbing, the belt drum is rotated in the uncoiling direction and the torsion rod is twisted about its axis with the consumption of energy. After tightening of the belt such a torsion rod permits a reverse rotation of the belt drum through an angle of rotation, which is more than sufficient for the intended energy conversion. Torsion rods of suitable types of steel allow twist through more than 360° between the two axial ends of the torsion rod. The torsion rod may with particular advantage be coaxially accommodated within the belt drum, a first axial end thereof being coupled with the belt drum and the opposed axial end thereof being formed as a cylindrical coupling head, which is surrounded by coupling members of the clamping roller coupling mechanism. In this arrangement the torsion rod merely occupies the space which is normally taken up in a conventional belt retractor by a bearing pin for the belt drum.

Further features and advantages of the invention will be gathered from the following description and the drawing, which is referred to.

Figure 3:
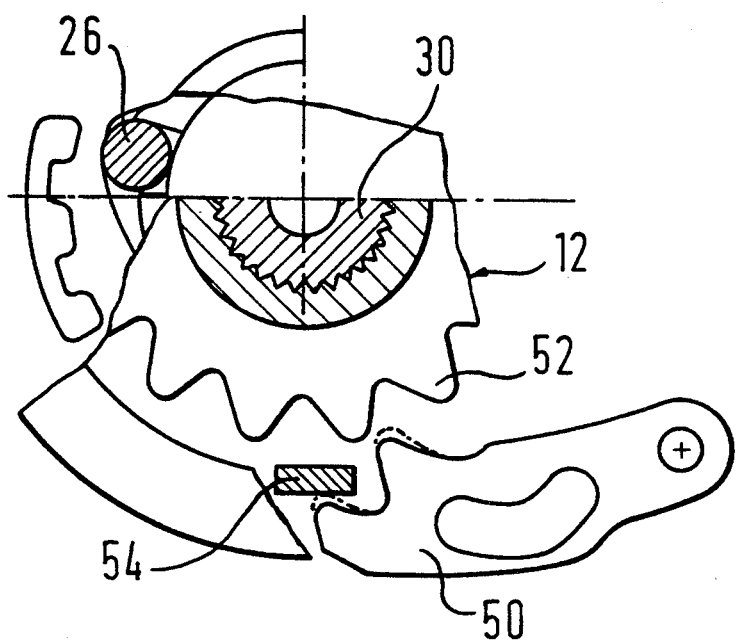

FIG. 3 diagrammatically shows a locking pawl in cooperation with ratchet teeth on the belt of the retactor.

Figure 1:
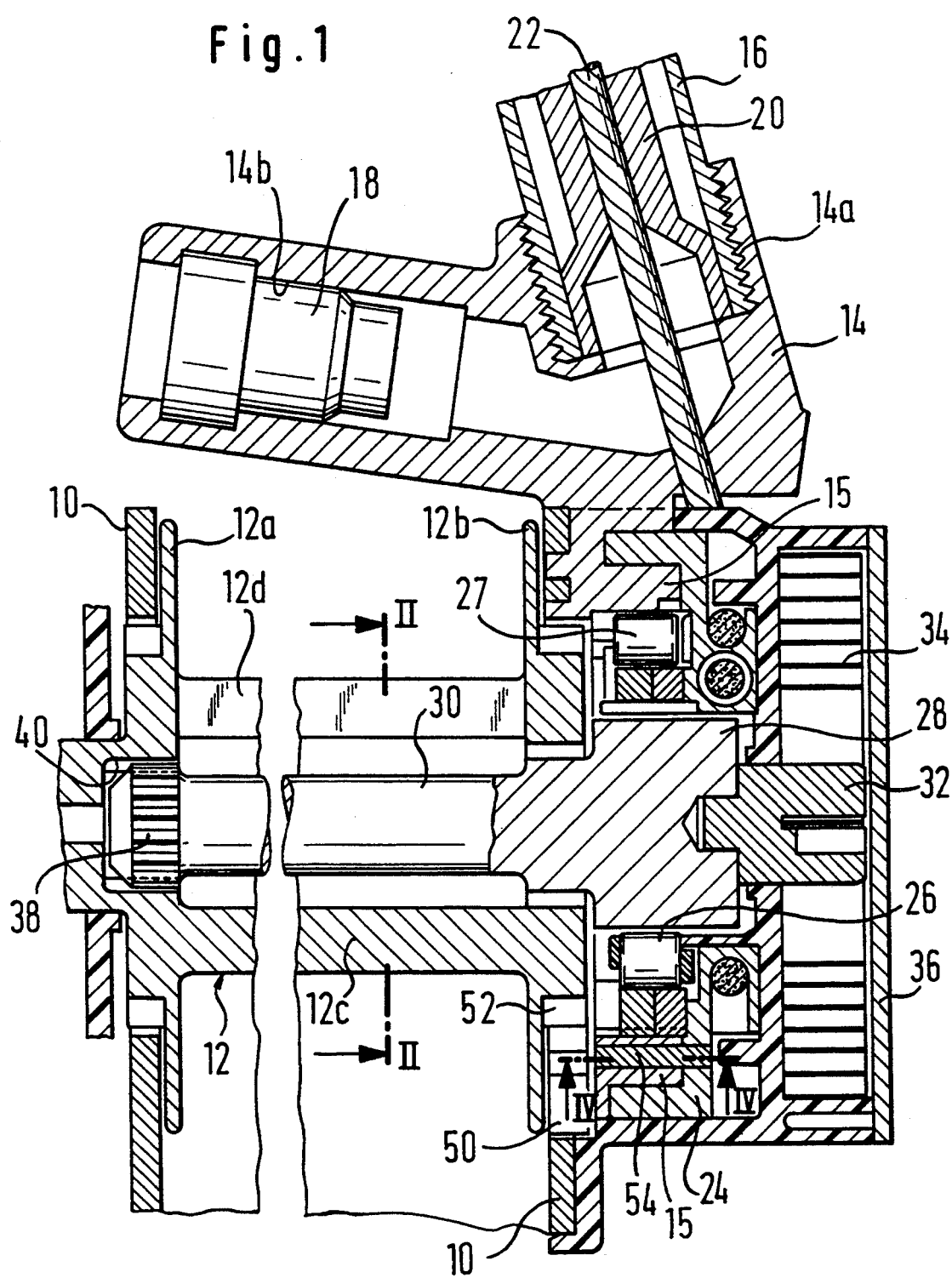
FIG. 1 is a view of part of a safety belt retractor with a belt pretensioner device.
Figure 4:
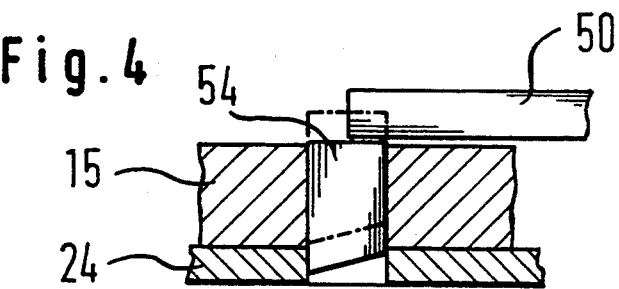

FIG. 4 is a section taken on the line IV—IV of FIG. 1.

In the belt retractor illustrated in FIG. 1 a hollow belt drum 12 is rotatably mounted between the limbs of a load beating frame 10. A socket 14 for a pyrotechnical piston and cylinder drive of the belt retractor is attached to the frame 10. This socket 14 has a screw threaded hole 14a into which one end of a cylinder 16 may be screwed and a receiving hole 14b for a pyrotechnical gas generator 18. In the interior of the cylinder 16 there is a piston 20 to which a pulling cable 22 is attached. The pyrotechnical drive of the belt pretensioner device is of conventional construction and is therefore not described in detail. The pulling cable 22 is coiled up in a plurality of turns in the groove of a pulley 24 and its one end is secured to the pulley. This pulley 24 is generally bell-like and is a component of a clamping roller coupling mechanism, whose coupling rollers 26 are moved into engagement with a cylindrical coupling head 28 on a torsion rod 30 by rotation of the pulley 24 when the belt pretensioner device is operated, such torsion rod being coaxially mounted in the interior of the hollow belt drum 12. A clamping roller blocking mechanism with blocking rolls 27 is arranged in a bearing ring 15, which is integrally connected with the socket 14, such rolls 27 functioning to prevent rotation of the pulley 24 in the belt pay-off direction. Furthermore, a hub 32 is in engagement with the coupling head 28 and is engaged by the inner end of a spiral spring 34, which is accommodated in a spring housing 36, with which the outer end of the spiral spring 34 is connected. The spiral spring 34 constitutes the wind-up spring of the belt retractor whose spring force is transmitted via the hub 32 and the torsion rod to the belt drum 12.

Figure 2:
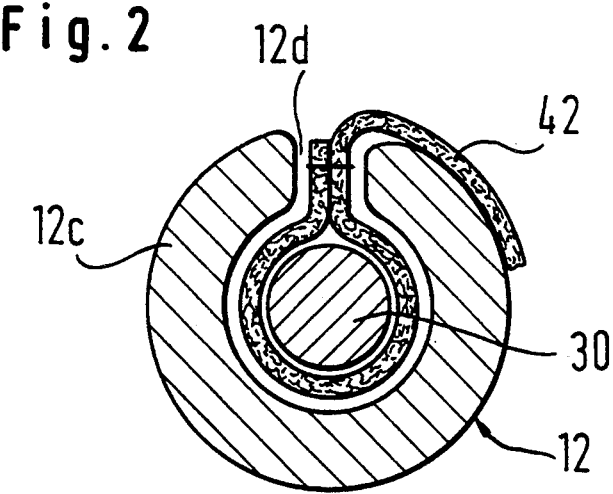
FIG. 2 is a cross section taken on the line II—II of FIG. 1.

At its axial end remote from the coupling head 28 the torsion rod 30 is provided with a knurled cap piece 38, which is interlockingly arranged in a suitably configured recess 40 in the belt drum 12. The belt drum 12 essentially consists of two lateral flanges 12a and 12b and an essentially hollow cylindrical casing 12c which has a slot 12d for the passage of the belt 42 taken up on the belt drum 12, see FIG. 2. The torsion rod 30 extends through the cylindrical cavity of the casing 12 of the belt drum. The end of the belt 42 constitutes a loop, which is slipped over the torsion rod 30. The torsion rod 30 is connected with the drum 12 in such a manner as to prevent relative twist by the knurled cap piece 38. In the neutral position, which is illustrated in FIG. 1, the coupling rollers 26 are out of engagement with the coupling head 28, so that the belt drum 12 is free to be rotated with the torsion rod 30.

When the belt pretensioner device is put into operation in a known manner, the gases released by the gas generator 18 move the piston 20 in the cylinder 16 towards its free end, a torque being exerted by the intermediary of the pulling cable 22 on the periphery of the pulley 24. Owing to the rotation of the pulley 24 then taking place, firstly the coupling rollers 26 are moved into coupling engagement with the cylindrical coupling head 28, so that the pulley 24 and the coupling head 28 are coupled for joint rotation. The torsion rod 30 transmits the rotation of the pulley 24 to the belt drum 12, which is driven in the wind-up direction, so that the slack of the belt in the safety belt system is taken up. When the belt is pulled fight the coupling rollers 26 are jammed between the pulley 24 and the coupling head 28, so that the torsion rod 30 is still coupled in rotation with the pulley 24. The pulley 24 is for its part locked against rotation in the belt pay-off direction by the blocking rolls 27 on the bearing ring 15.

If now after the belt has been pulled tight a high tensile occurs in the safety belt system and at a tension of some kN's a corresponding high torque is transmitted by the belt to the belt drum, the torsion rod 30 will start to plastically deform by twisting about its axis. This plastic deformation means that energy will be consumed and load peaks occurring in the belt will be substantially absorbed. By suitable selection of the dimensions and the material of the system both the threshold, at which plastic deformation of the torsion 30 rod commences, and also the further behavior of the system and the damping action produced thereby may be adjusted within a large range.

Belt retractors of the type described are generally provided with a vehicle-and belt-sensitive locking mechanism. The latter comprises a lock pawl 50 (see FIG. 3), for cooperation with ratchet teeth 52 on the flange 12b of the belt drum 12. In order to ensure that after tightening of the belt reverse rotation of the belt drum be possible for twisting of the torsion rod 30, it is necessary to ensure that the locking pawl 50 remain out of engagement with the locking teeth 52 of the belt drum 12. For this purpose an inhibiting plate 54 is mounted in a bearing ring 15, which is made in one piece with the socket 14, so that such plate 54 may move axially. The inhibiting plate 54 has an obliquely cut end, which is adjacent to the pulley 24, fitting into a ramplike recess in the said pulley 24 and its opposite end is directly adjacent to the pawl 50 as long as the belt pretensioner device is not operational, see FIG. 4. As soon as the pulley 24 starts to rotate, it will urge the locking plate 54 axially into the path of pivotal movement of the pawl 50, which is no longer able to come into engagement with the ratchet teeth 52 of the belt drum 12.

What is claimed is:

1. A safety belt retractor with a frame, a belt drum rotatably mounted in said frame for coiling and uncoiling of belt webbing and a belt pretensioner device comprising a rotary drive with a drive member for rotating, in operation, said belt drum in a coiling direction, said drive member engaging said belt drum through a coupling mechanism and a torsion bar, said torsion bar having a first axial end connected to said belt drum and a second axial end adapted to be engaged by said drive member through said coupling mechanism, said second axial end being free to rotate in said frame with said belt drum in a normal condition where said coupling mechanism is disengaged and coupled with said drive member for joint rotation in an operative condition where said coupling mechanism is engaged, and means for holding said second axial end of said torsion rod fixed against rotation in said frame after operation of said rotary drive while said first axial end of said torsion rod rotates with said belt drum and said torsion rod is twisted under the action of tension occurring in the belt webbing and exceeding a predetermined threshold.

2. The safety belt retractor of claim 1, wherein said belt drum is hollow and said torsion rod is coaxially arranged in said belt drum.

3. The safety belt retractor of claim 1, wherein said torsion rod has a cylindrical coupling extension on said second axial end and said coupling mechanism is a coupling roller mechanism with coupling roller members arranged to selectively establish a driving connection between said drive member and said coupling extension upon relative rotation of said drive member and said coupling extension in said coiling direction.

4. The safety belt retractor of claim 1, wherein said means for holding includes a blocking mechanism for holding said drive member fixed against rotation with respect to said frame after operation of said rotary drive.

5. The safety belt retractor of claim 4, wherein said blocking mechanism is a clamping roller mechanism with blocking roller members arranged to selectively establish a blocking connection between said drive member and said frame upon rotation of said drive member in said uncoiling direction.

6. The safety belt retractor of claim 3, wherein said drive member is a drive disk provided with recesses for accommodation of said coupling roller members and said blocking roll members.

7. The safety belt retractor of claim 1, wherein said belt drum is adapted to be blocked in rotation by a vehicle-sensitive blocking mechanism and said vehicle-sensitive blocking mechanism is disabled upon rotation of said drive member.

8. The safety belt retractor of claim 7, wherein said vehicle sensitive blocking mechanism comprises a blocking pawl pivotally mounted in said frame between a blocking position engaging said belt drum and a normal rest position disengaged from said belt drum, and an inhibiting member mounted in said frame for movement between an inhibiting position holding said blocking pawl in said rest position and a normal position, said inhibiting member being moved from said normal position to said inhibiting position by rotation of said drive member.

* * * * *